March 23, 1965   W. M. MAY ETAL   3,174,575
MOUNTING DEVICE FOR TILTING INTEGRAL HOOD AND FENDER ASSEMBLY
Original Filed Feb. 20, 1962   5 Sheets-Sheet 4
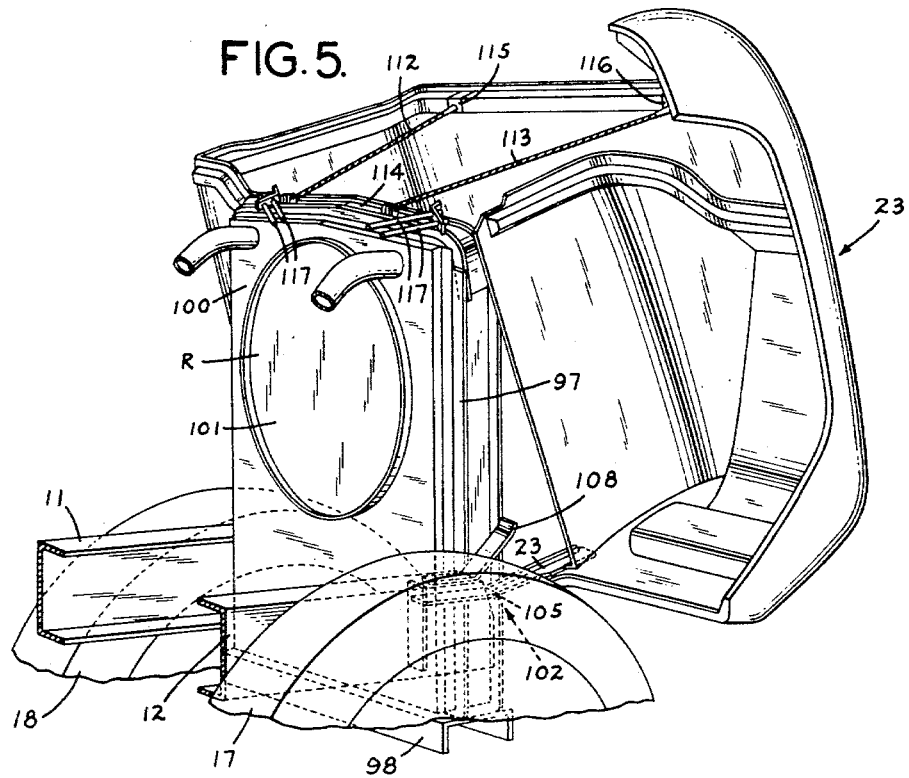
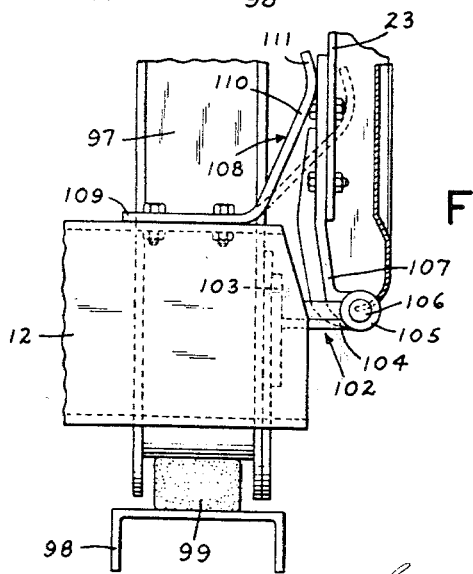
INVENTORS:
WALTER M. MAY
DONALD W. GLASENAPP
HARRY J. WARMKESSEL
THEIR ATTORNEYS March 23, 1965  W. M. MAY ETAL  3,174,575
MOUNTING DEVICE FOR TILTING INTEGRAL HOOD AND FENDER ASSEMBLY
Original Filed Feb. 20, 1962  5 Sheets-Sheet 5
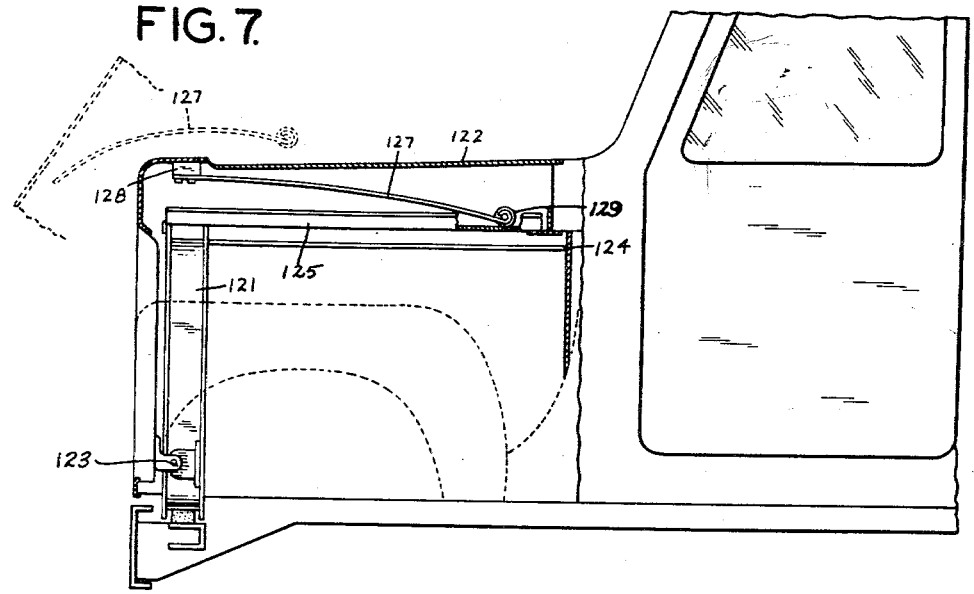
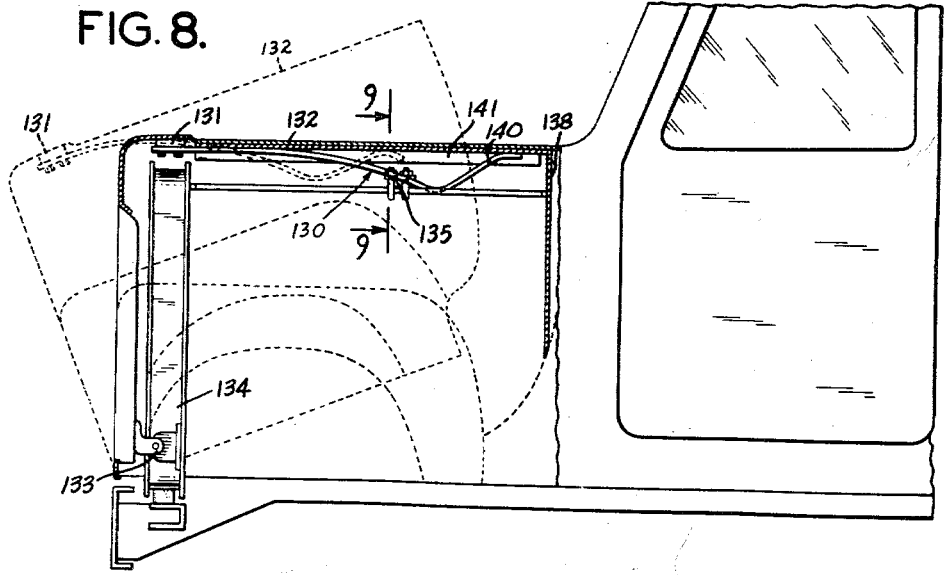
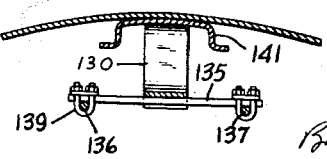
INVENTORS
WALTER M. MAY
DONALD W. GLASENAPP
HARRY J. WARMKESSEL
BY
THEIR ATTORNEYS United States Patent Office 3,174,575
Patented Mar. 23, 1965

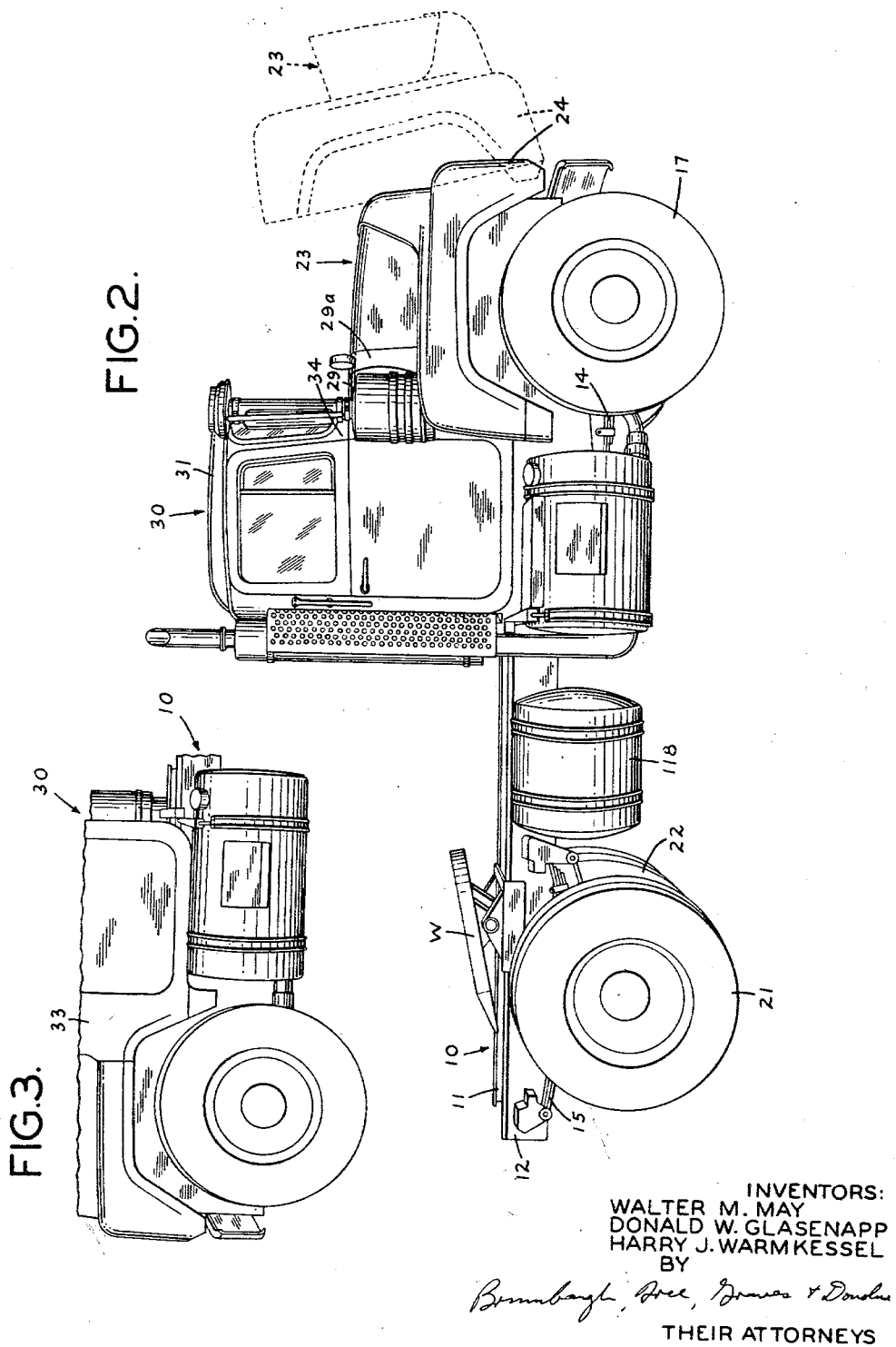

3,174,575
MOUNTING DEVICE FOR TILTING INTEGRAL HOOD AND FENDER ASSEMBLY
Walter M. May, Allentown, Pa., Donald W. Glasenapp, Rochester, Mich., and Harry J. Warmkessel, Allentown, Pa., assignors to Mack Trucks, Inc., Plainfield, N. J., a corporation of New York
Original application Feb. 20, 1962, Ser. No. 174,426. Divided and this application May 1, 1963, Ser. No. 277,315
4 Claims. (Cl. 180—69)

This invention relates to improvements in motor vehicles, and it relates particularly to improvements in counter-balance springs and devices for tilting hood assemblies in trucks and tractors for tractor-trailer combinations.

This application is a division of our copending application Serial No. 174,426, filed on February 20, 1962, for a "Motor Vehicle."

The design and production of truck-type vehicles, especially tractor trucks, is limited and hampered by many factors beyond the control of the engineer and the manufacturer. Almost all states have laws governing and limiting the over-all length, width and load-carrying capacity of trucks and tractor-trailer combinations. In order to carry the maximum cargo within the limits provided by law, the trailer must be as long as possible with the result that the overall length of the driver's cab and the hood, if any, on the vehicle must be kept at a minimum.

With the large displacement, high-torque engines required in such tractors, it has been difficult to keep the over-all length and width of the cab within the maximum limitations available. One solution has been to mount the cab of the vehicle over the engine and provide a tunnel extending lengthwise of the cab in which the upper portion of the engine is housed. Access is had to the engine by mounting the cab for tilting or other movement relative to the frame. While such tilting cab structures are satisfactory and are widely used, they also are expensive for the reason that the cab must be a rigid, self-sustaining structure and expensive mechanisms must be provided for counterbalancing or raising the cab relative to the frame. Also, all controls must be flexible or capable of being disengaged to allow the cab to tilt. So long as the engine of the vehicle is relatively narrow in transverse width, e.g., an in-line engine, it can be housed in a tunnel of reasonable size in the floor of the cab while still leaving room for the driver and his assistant and for the operating controls of the cab.

When a different type of engine, such as a high-torque V-type engine of high-piston displacement is to be used in such a tilting cab vehicle, the problem becomes much more difficult for the reason that such engines are very wide and while they may be lower in over-all height, they require such a wide tunnel in the cab that the space for the driver and his assistant is greatly reduced. The cab cannot be made sufficiently wide to compensate fully for the wider tunnel due to width regulations. Moreover, if the cab is made wider, less space is available for such externally-mounted accessories as the air cleaner for the engine, the exhaust stack, side-view mirrors and the like, which are essential to the operation of the vehicle.

In accordance with the present invention a truck or tractor vehicle is provided which overcomes the disadvantages of the vehicles referred to above and enables a V-type, large piston displacement and high-torque engine to be used while keeping the over-all length and width of the cab and associated elements within the limits imposed by state regulations and maximum trailer length.

A feature of the invention is the provision of a sturdy mount on the vehicle frame to support the hood for tilting movement, the mount also serving to protect the radiator, support it resiliently and thereby relieve it of stresses. The mount also may support a shroud for the fan of the vehicle and a radiator shutter.

Other features and advantages of the structure will be apparent from the following description and accompanying drawings in which:

FIGURE 2 is a side elevational view of the vehicle;

FIGURE 3 is a side elevation of a portion of the vehicle viewed from the opposite side than that of FIGURE 2;

FIGURE 5 is a view of a portion of the vehicle showing the hood in a forwardly-tilted position;

FIGURE 6 is a side elevational view and partial sectional view showing the hinge and counterbalance spring for the hood of the vehicle;

FIGURE 7 is a view partly in side elevation and partly in section of the cab and hood portion of the vehicle showing a modified form of spring structure for counterbalancing the hood;

FIGURE 8 is a view partly in side elevation and partly in section illustrating another form of hood counterbalance; and FIGURE 9 is a view in cross section and partly broken away taken on line 9—9 of FIGURE 8.

Figure 1:
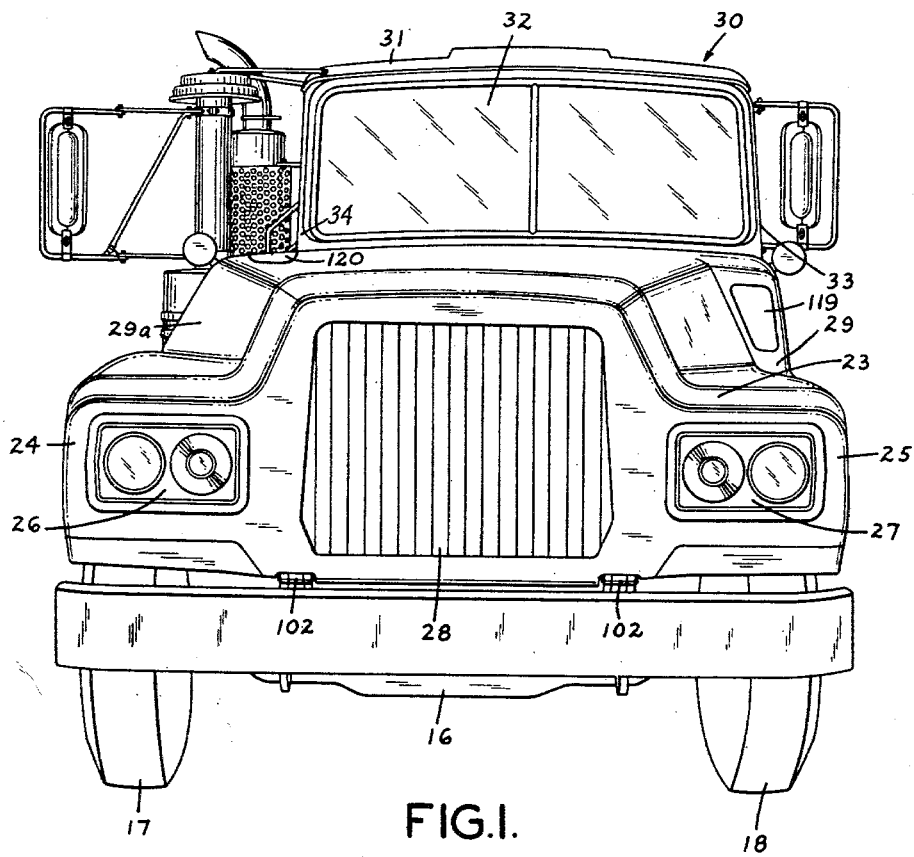
FIGURE 1 is a front elevational view of a typical tractor truck embodying the present invention.
Figure 4:
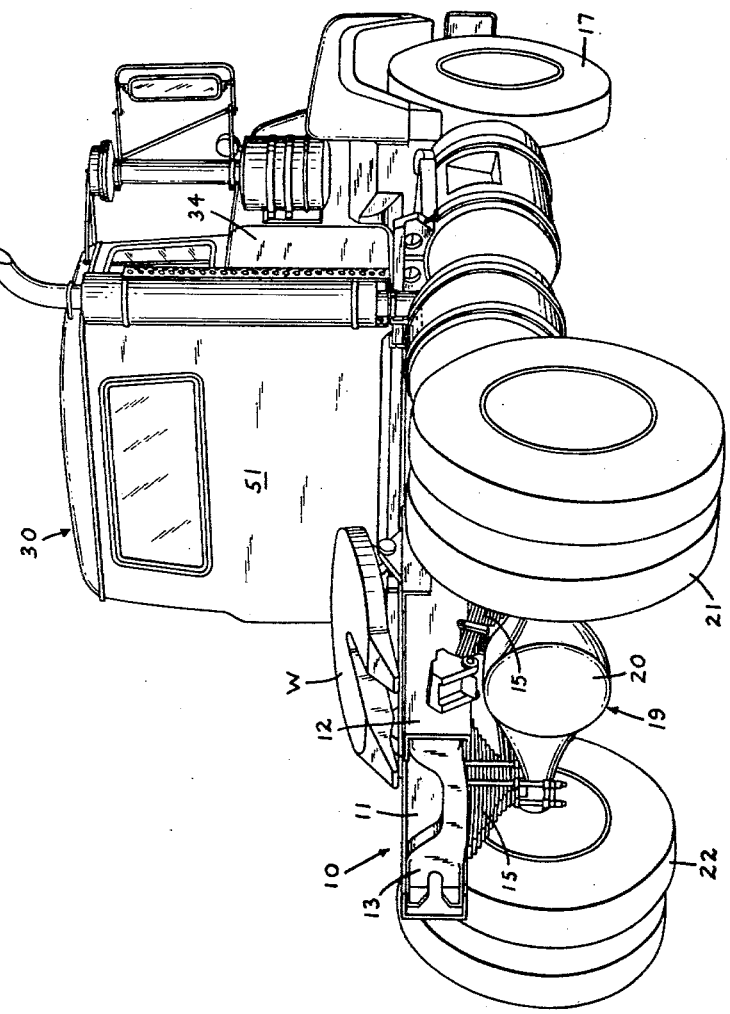
FIGURE 4 is a rear perspective view of the vehicle.

The vehicle chosen for purposes of illustration of the present invention is a tractor for hauling a trailer of the box or other type. As illustrated, the vehicle includes a strong frame 10 made up of a pair of longitudinally extending channel members 11 and 12 with suitable cross bracing members 13, etc., spaced along the length of the frame. The vehicle may have any desired type of suspension, such as, for example, leaf springs 14 and 15 mounting, respectively, the front axle 16 and the front steering wheels 17 and 18 and a rear axle 19 including a differential 20 and having single or dual wheels 21 and 22. Any suitable type of shackles or supports for mounting the springs on the frame may be used. Any suitable type of propeller shaft and transmission may be provided for driving the rear wheels, as may be desired.

In the tractor illustrated, a high piston displacement, high torque, spark or compression ignition V-8 engine together with its accessories, not shown, is mounted at the forward portion of the frame.

As best shown in FIGURES 1 and 2, the engine and the radiator therefor are housed in a unitary assembly of a hood 23 and fenders 24 and 25 in which the headlights 26 and 27, radiator shutter 28 and the like are mounted. The hood and fender assembly may be formed of metal but preferably the entire assembly is molded of resin-bonded fiberglass to conserve weight and to provide a rigid and vibration-resistant structure of good heat-insulating and sound-absorbing characteristics. The shapes of the hood and the fenders can be modified as desired.

The hood merges into a cowl portion 29 on the front of the driver's cab 30 and is movable relative to the cab, as shown in dotted lines in FIGURE 2 to uncover the radiator and engine of the vehicle for servicing or repair. The top 31 and the windshield 32 of the cab 30 are offset from the longitudinal center line of the frame and the engine as viewed in FIGURE 1. The side panel 33 of the cab 30 on the driver's side is disposed about in the plane of the outer edge of the left-hand fender 25, while the side panel 34 of the cab on the assistant driver's side is disposed about in a vertical plane containing the outside of the frame channel member 12. Both side panels of the cab 30 are provided with the doors to permit entry and exit from the cab.

A V-type engine is substantially shorter in over-all length than an in-line engine of the same displacement or torque output so that the hood 23 can be relatively short in a fore-and-aft direction thereby permitting the cab to be made long enough to provide space therein for the seats for the driver and the assistant driver and the controls for the vehicle. With this arrangement, the over-all length from the front of the hood to the back panel 51 of the cab can be kept within space limitations determined by state regulations governing the over-all length of a tractor and trailer.

As indicated above, the hood and fenders of the truck form a single unit which is arranged for pivoting movement around an axis adjacent the front end of the frame 10 of the vehicle. As shown in FIGURES 5 and 6, a peripheral enclosure or frame 97 formed of channel or angle iron is mounted flexibly between the front ends of the frame members 11 and 12 on a cross-frame member 98. The radiator R for the engine is mounted within the enclosure 97 by means of shock absorbing rubber mounts. Cushioning blocks 99 of rubber or the like are interposed between the cross-frame member 98 and the frame 97 to permit limited relative movement between the vehicle frame 10 and the enclosure frame 97 and absorb vibration. A shroud 100 having a fan opening 101 therein and the radiator shutter 28 are also secured to and mounted on the radiator R.

A hinge member 102 having a leaf provided with a right angularly-disposed foot 103 is bolted or welded to each upright side of the frame 97. A forwardly-extending arm 104 on the leaf has an eye 105 thereon for receiving a hinge pin 106 to support pivotally a hinge leaf 107 which is bolted or otherwise secured to the front of the hood 23 adjacent to one vertical edge of the hood opening, the location of the hinges being shown in FIGURE 1. The rigid support of the hinges afforded by the enclosure frame 97 prevents racking or twisting of the hood as it is pulled forward or returned to engine-covering position. The resilient mount for the enclosure frame 97 on the vehicle frame 10 also reduces racking and twisting of the hood during operation of the vehicle.

In order to partially counterbalance the weight of the hood and facilitate movement to its engine-uncovering position, springs 108 are mounted on each frame member. Each of the springs has a base 109 bolted to the upper flange of a frame member 11 or 12, for example, and an upwardly-inclined spring arm 110 which is slightly bent as at 111 for engagement with the upper leaf 107 of each hinge. Other types of springs, such as springs having arms connected by a coiled portion, can also be used. The normal stress-relieved or neutral position of the spring is indicated in dotted lines in FIGURE 6. When the hood is moved to closed or engine-covering position, the arm 110 is flexed so that it normally tends to urge the hood forward and aids in raising it to uncover the engine.

A pair of flexible steel cables 112 and 113 are connected at their opposite ends to the upper cross member 114 of the enclosure frame 97 and at their other ends to brackets 115 and 116 on the inside of the hood near its rear edge to limit forward tilting of the hood. Deflection of the frame 97 by the weight of the hood is prevented by means of rods 117 connecting the cross member 114 to the cowl 29 of the cab. The tie rods hold the radiator in its desired position during actual running and keep "fan-to-shroud" relationship acceptable during all phases of chassis articulation.

FIGURE 7 illustrates a modified form of spring counterbalance for the hood of the vehicle. As shown in FIGURE 7, the radiator enclosure frame 121 on which the hood 122 is mounted is similar to the enclosure frame 97 described above. Hinges 123 are mounted on the frame 121 to support the hood 122 for tilting movement. Extending forwardly from the fire wall 124 of the cab is an upwardly and forwardly-extending channel member 125 which is secured at its forward end to frame 121.

An arcuate leaf spring 127 is secured at its forward end to a mounting block 128 fastened to the hood 122 and has a free rear end provided with a roller 129 engaging the channel member 125. With this counterbalance, when the hood is in its closed position, the normally bent leaf spring 127 is flexed and partially straightened. When the hood is released, the normal resiliency of the spring tending to bend it to the curvature shown in dotted lines in FIGURE 7 will raise the hood or assist in raising the hood partially to the dotted-line position.

Another type of hood counterbalance is shown in FIGURES 8 and 9. In this counterbalance structure a curved leaf spring 130 is secured at its forward end to a mounting block 131 affixed to the hood 132. A hinge 133 at each side of the front of the hood supports the hood on the enclosure frame 134. A cross rod 135 is secured at its opposite ends to the tie rods 136 and 137 extending from the fire wall 138 to the enclosure frame 134. U-bolts 139 may be used to secure the rod 135. A downwardly-curved portion of the spring 130 engages the rod 135, while an upwardly-bent rear end portion 140 on the spring engages and bears resiliently against an inverted channel member 141 fixed to the inner surface of the hood 132. With this counterbalance, when the hood is in its lowered engine-covering position, the spring is flexed by engagement with the rod 135 and also by engagement of its end 140 with the channel member 141. Accordingly, when the hood is released, the spring exerts a force against the rod 135 and against the channel member 141 thereby tending to raise the hood or assist in raising the hood almost to the dotted-line position as shown in FIGURE 8. Other variations in the spring structures for raising the hood also may be provided.

The tractor frame 10 is, as illustrated, provided with a conventional fifth wheel W and it also carries an air tank 118 for storing air for the brake system and the like.

Appropriate ventilating means may be provided for the cab and such other changes as may be necessary may be made in the vehicle to facilitate its use and improve its comfort for the drivers. As shown in FIGURE 1, a ventilator 119 in the cowl 29 may be provided on the driver's side. This ventilator together with the offset relation of the engine hood keeps the driver's feet and legs cool. A fresh air inlet 120 which may be connected to the heater is provided in the cowl portion 29a.

It will be understood that many components of the vehicle are susceptible to wide modification, as, for example, the spring suspension, the type of engine and transmission, the details of structure and design and appearance of the hood, cab and the like. Accordingly, the vehicle described herein should be considered as illustrative and not as limiting the scope of the following claims.

We claim:

1. In a vehicle having a frame, an engine mounted in said frame and a radiator for said engine mounted on said frame, the combination of a hood for covering said engine, substantially rigid uprights resiliently mounted on said frame on opposite sides of said radiator, hinge means mounted on said uprights and connected with said hood for supporting it for tilting movement between engine-covering and engine-uncovering positions, means for urging said hood from said engine-covering position toward said engine-uncovering position, said means including a leaf spring having one end attached to said hood and a free end, and means mounted on said frame and engageable with said free end for flexing said spring when said hood is in said engine-covering position.

2. The vehicle set forth in claim 1 in which said means mounted on said frame comprises at least one channeled bar mounted parallel to the longitudinal axis of said vehicle beneath said hood whereby the free end of said leaf spring rides in said channeled bar and flexes said spring when said hood is placed in engine covering position.

3. The vehicle set forth in claim 1 in which said leaf spring has a portion sloping in a first direction downwardly from the end attached to said hood and a portion sloping in a second direction toward its free end and in which said means mounted on said frame comprises two bars mounted parallel to the longitudinal axis of said vehicle and a cross bar supported by said two longitudinal bars positioned to engage the portion of said spring sloping in said first direction and to flex said spring when said hood is placed in engine-covering position.

4. In a vehicle having a frame, an engine mounted in the frame and a radiator for the engine mounted on the frame, the combination of substantially rigid uprights on opposite sides of said radiator, a cross member connecting the lower ends of said uprights, said cross member and uprights resiliently mounted on the vehicle frame, a hood for covering the engine, hinge means mounted on said uprights and connected with said hood for supporting it for tilting movement between engine-covering and engine-uncovering positions, a leaf spring having one end attached to the vehicle frame and a free end, and means on said hood engageable with said free end for flexing said spring when said hood is in said engine-covering position.

References Cited in the file of this patent
UNITED STATES PATENTS

| | | |
|---|---|---|
| 1,593,244 | Cutler | July 20, 1926 |
| 1,598,868 | Lundelius | Sept. 7, 1926 |
| 2,188,891 | Haltenberger | Jan. 30, 1940 |
| 2,332,377 | Haltenberger | Oct. 19, 1943 |
| 2,740,487 | Murty et al. | Apr. 3, 1956 |
| 3,017,944 | Norrie | Jan. 23, 1962 |